United States Patent
Rohleder et al.

(10) Patent No.: US 10,120,819 B2
(45) Date of Patent: Nov. 6, 2018

(54) SYSTEM AND METHOD FOR CACHE MEMORY LINE FILL USING INTERRUPT INDICATION

(71) Applicant: NXP USA, Inc., Austin, TX (US)

(72) Inventors: Michael Rohleder, Bayern (DE); Stefan Singer, Vaterstetten (DE); Josef Fuchs, Munich (DE)

(73) Assignee: NXP USA, Inc., Austin, TX (US)

( * ) Notice: Subject to any disclaimer, the term of this patent is extended or adjusted under 35 U.S.C. 154(b) by 136 days.

(21) Appl. No.: 15/462,992

(22) Filed: Mar. 20, 2017

(65) Prior Publication Data

US 2018/0267913 A1    Sep. 20, 2018

(51) Int. Cl.
G06F 12/00     (2006.01)
G06F 13/24     (2006.01)
G06F 12/0891   (2016.01)

(52) U.S. Cl.
CPC ......... *G06F 13/24* (2013.01); *G06F 12/0891* (2013.01); *G06F 2212/60* (2013.01)

(58) Field of Classification Search
None
See application file for complete search history.

(56) References Cited

U.S. PATENT DOCUMENTS

| 6,321,296 | B1 | 11/2001 | Pescatore | |
| 6,978,350 | B2 * | 12/2005 | Birk | G06F 1/04 |
| | | | | 711/133 |
| 7,685,410 | B2 * | 3/2010 | Shen | G06F 9/3808 |
| | | | | 712/237 |
| 8,291,202 | B2 | 10/2012 | Streett et al. | |
| 2008/0059766 | A1 * | 3/2008 | Hansen | G06F 9/30014 |
| | | | | 712/37 |
| 2008/0189487 | A1 * | 8/2008 | Craske | G06F 12/0859 |
| | | | | 711/125 |

OTHER PUBLICATIONS

Lynx, Roger "How to use ARM's data-abort exception," Aug. 25, 2006; downloaded from <<http://www.embedded.com/design/prototyping-and-development/4006695/How-to-use-ARM-s-data-abort-exception>>, 18 pages.

* cited by examiner

*Primary Examiner* — Cheng Yuan Tseng

(57) ABSTRACT

An embedded computer system includes a processor, an interrupt source, an interrupt controller and a cache memory subsystem. In response to a request from the processor to read a data element, the cache memory subsystem fills cache lines in a cache memory with data elements read from an upper-level memory. While filling a cache line the cache memory subsystem is unable to respond to a second request from the processor which also requires a cache line fill. In response to receiving an indication from an interrupt source, the interrupt controller provides an indication substantially simultaneously to the processor and to the cache memory subsystem. In response to receiving the indication from the interrupt controller, the cache memory subsystem terminates a cache line fill and prepares to receive another request from the processor.

20 Claims, 5 Drawing Sheets

SYSTEM AND METHOD FOR CACHE MEMORY LINE FILL USING INTERRUPT INDICATION

FIELD OF THE DISCLOSURE

The present disclosure relates generally to digital systems and methods, and more particularly to filling cache lines in a cache memory system.

BACKGROUND

Embedded computer systems can have many interrupts occurring in a brief time interval. In such systems, latency of interrupt processing can be very important. Latency is the interval between the time that an interrupting device asserts an interrupt signal and the time that a processor executes code to handle the interrupt. A short interrupt latency interval is desirable. In some application domains, a small variation of interrupt latencies is also desirable. A small variation in possible latency interval lengths results in a greater predictability of when a processor will begin executing code to process the interrupt. For example, a computer system can have a short average interrupt latency, but for a very small fraction of interrupt events the latency can be so long that an interrupt is not handled properly and the system fails.

Hierarchical memory systems, such as those including a cache sub-system, can affect interrupt latencies in some systems. While cache memories generally improve system performance by allowing code and data to be accessed from fast cache memories instead of slower memory, loading cache memories can introduce unpredictable delays. A cache memory can be organized into cache lines, and the system designed such that one a cache sub-system begins filling a cache line it must complete filling the cache line before beginning another operation. When the next operation to be performed is providing a memory word to a processor in order for the processor to begin executing interrupt handler code, the latency of interrupt processing by the processor can be affected. If the request to provide a word occurs just as the cache sub-system begins filling a cache line, the processor can be forced to wait until the current cache line fill is completed before beginning a cache search or for the interrupt handler code.

BRIEF DESCRIPTION OF THE DRAWINGS

The present disclosure may be better understood, and its numerous features and advantages made apparent to those skilled in the art by referencing the accompanying drawings. It will be appreciated that for simplicity and clarity of illustration, elements illustrated in the Figures have not necessarily been drawn to scale. For example, the dimensions of some elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Figure 1:
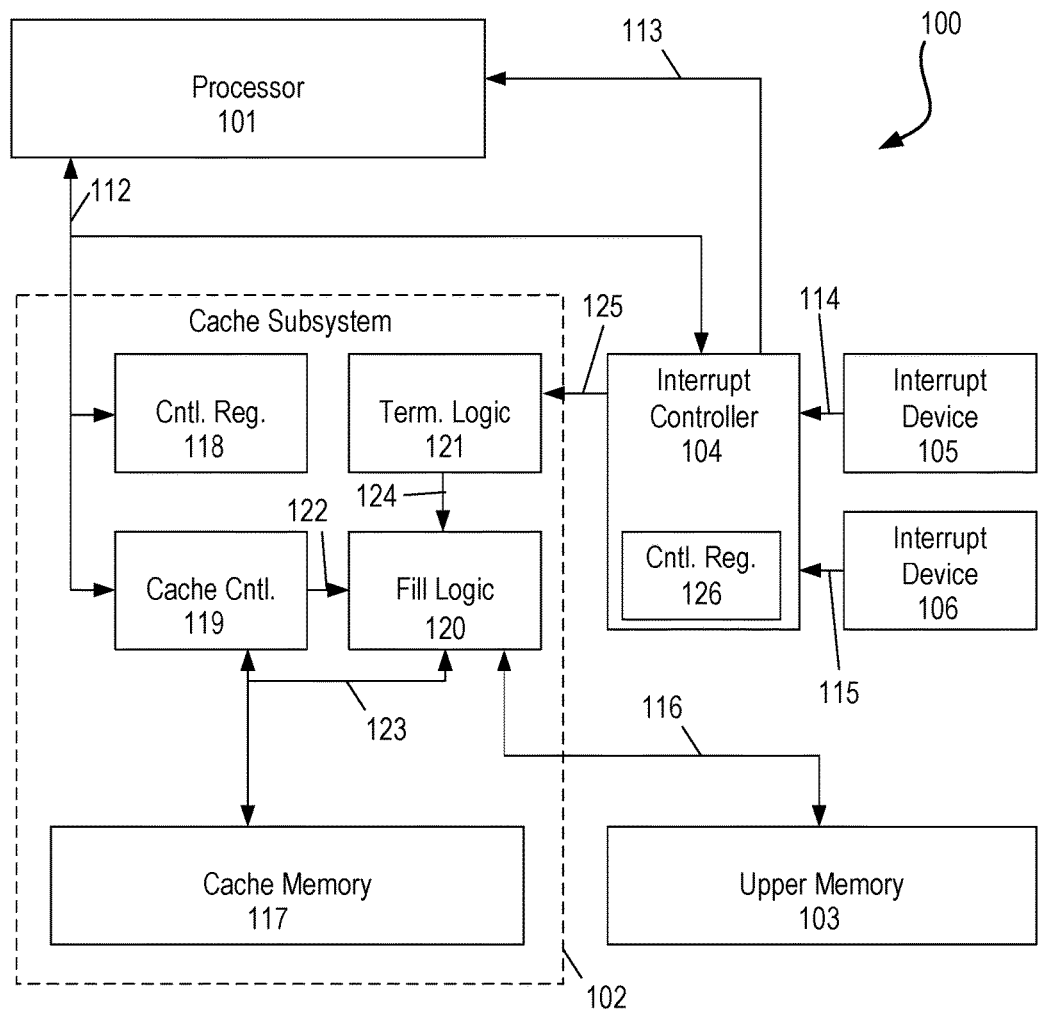
FIG. 1 is an illustration of a digital system according to at least one embodiment of the present disclosure.

In accordance with an embodiment of the present disclosure, a digital system, such as a microcontroller-based communication device, includes a data processor, a cache memory subsystem, a memory subsystem, an interrupt controller and a device which generates interrupt indications. In response to receiving an interrupt indication through the interrupt controller, the data processor suspends executing a code sequence which happens to be executing and begins executing a code sequence corresponding to the particular interrupt indication received. A length of time between the data processor receiving the interrupt indication and the data processor beginning to execute the code sequence corresponding to the interrupt indication can be referred to as the interrupt latency. In particular applications, short interrupt latencies are preferred. For example, a data processor controlling the operation of a high speed computer network may need to process a data packet before the next packet arrives. For some applications, a small variation among interrupt latencies across time is also important. Even though average interrupt latency can be very low in a system, very infrequently having a very long interrupt latency can be unacceptable. A network system that occasionally experiences an interrupt latency long enough to miss a packet may appear to be randomly losing packets. In such a system interrupt latencies with a narrow range of variation can be preferred to a system with shorter average interrupt latency.

The length of the latency of a particular instance of an interrupt indication in a digital system can depend on several factors. Not all of the factors are the same each time a particular type of interrupt indication is received. Some factors may be constant each time an interrupt indication is received. For example, the length of time needed to save an internal state of the data processor for the code sequence executing at the time that the interrupt indication was received may be constant independent of the particular code sequence. Other factors may vary. In particular, the state of the cache memory subsystem can contribute a significant variation to interrupt latency. Should the code sequence corresponding to the interrupt indication received be stored in the cache, interrupt latency may be small. Should the cache memory subsystem need to fetch data from the memory subsystem, interrupt latency may be significantly longer. Should the cache memory be performing another function, fetching code or data from main memory for another code sequence, interrupt latency can be longer still as a current operation must be completed before the cache memory subsystem is available for use by an interrupt processing code sequence.

In order to reduce the variability in interrupt latency times in a digital system, a data processor and a cache memory subsystem can be configured to receive an interrupt indication from an interrupt controller substantially simultaneously. In an embodiment, an interrupt indication can be provided to both a cache memory subsystem and to a data processor in response to a common clock edge using separate wires or using a common connection. In an embodiment, an interrupt indication to a data processor can be delayed relative to the interrupt indication to a cache memory subsystem, or vice-versa. The cache memory subsystem can begin to take action to prepare for requests from the data processor related to the interrupt indication. In embodiments, a cache memory subsystem can terminate reading data into a cache memory in response to receiving an interrupt indication. In another embodiment, a cache memory subsystem can further begin to read code and data into a cache memory corresponding to the particular interrupt indication received. Operation of a cache memory subsystem receiving interrupt indications will be better understood based on the following description based on FIGS. 1-5.

FIG. 1 illustrates an embodiment of a device 100 including data processor 101, cache memory subsystem 102, upper memory 103, interrupt controller 104, and interrupt devices 105 and 106. Data processor 101 executes code to implement particular functions of device 100, for example switching data packets when device 100 is a high speed network switch. Data processor 101 is connected to cache memory subsystem 102 and to interrupt controller 104 by system bus 112. Data processor 101 is further connected to interrupt controller 104 by interrupt interconnect 113. Interrupt controller 104 is connected to interrupt device 105 by interrupt interconnect 114 and to interrupt device 106 by interrupt interconnect 115. Interrupt controller 104 is connected to cache memory subsystem 102 by interrupt interconnect 125. Cache memory subsystem 102 is connected to upper memory 103 by upper memory bus 116.

Cache memory subsystem 102 includes cache memory 117, control register 118, cache control circuitry 119, cache fill circuitry 120 and line fill termination circuitry 121. Control register 118 and cache control circuitry 119 are connected to data processor 101 by system bus 112. Cache control circuitry 119 is connected to cache fill circuitry 120 by cache miss interconnect 122. Cache control circuitry 119 and cache fill circuitry 120 are connected to cache memory 117 by cache memory bus 123. Cache fill circuitry 120 is connected to upper memory 103 by upper memory bus 116. Cache fill circuitry 120 is connected to line fill termination circuitry 121 by termination signal interconnect 124. Line fill termination circuitry 121 is connected to interrupt controller 104 by interrupt interconnect 125.

Interrupt controller 104 receives interrupts from interrupt devices 105 and 106 on interrupt interconnects 114 and 115, respectively, in response to events detected by interrupt devices 105 and 105. The use of interrupt devices to indicate the occurrence of events in digital systems is well known in the art. Examples of events detected by interrupt devices 105 and 106 can include detecting that a real-time clock indicates a preconfigured time, receiving a data packet at a network interface, and detecting a key press at a keyboard. Upon receiving one or more interrupt indications, interrupt controller 104 determines which of the received interrupt indications to provide to data processor 101 at interrupt interconnect 113. According to the present disclosure, interrupt controller 104 can provide an interrupt indication to cache memory subsystem 102 at interrupt interconnect 125 substantially simultaneously with providing the interrupt indication to data processor 101 at interrupt interconnect 113. Interrupt controller 104 providing an interrupt indication directly to cache memory subsystem 102 allows the cache memory subsystem 102 to perform operations to improve interrupt performance, as will be described herein.

Interrupt controller 104 also includes control register 126. Control register 126 can be accessed by data processor 101 through system bus 112 in order to configure interrupt controller 104. Configuration information can include enabling or disabling interrupts, setting priority levels for interrupts, and enabling or disabling the provision of interrupt indications to cache memory subsystem 102. In an embodiment, control register 126 includes multiple memory addresses suitable for use when the amount of configuration information exceeds a number of bits of a single memory word.

During operation of digital system 100, data processor 101 executes program code which is stored at upper memory 103. Data processor 101 accesses upper memory 103 through cache subsystem 102. Data processor 101 makes requests at system bus 112 to read code from memory locations. Cache memory subsystem 102 receives requests from data processor 101 and fulfills the requests as will be described herein. Code executed by data processor 101 can be interrupt related code or non-interrupt related code. Non-interrupt related code is code executed to perform functions that are generally not related to an particular interrupt device and that are not time critical. Interrupt related code is executed in response to data processor 101 receiving an interrupt indication from interrupt controller 104 at interrupt interconnect 113. Interrupt related code is related to a particular interrupt device and can be time critical. For example, an interrupt device such as a real time clock can generate a sequence of interrupt indications. Processing for an interrupt indication must be completed prior to the arrival of a subsequent interrupt indication from the same device. When data processor 101 receives an interrupt indication while executing a code sequence, data processor 101 saves state information associated with the executing code sequence. Such state information can include, for example, the current value of a program counter and data stored in other registers of data processor 101. Data processor 101 then determines an address at which interrupt-related code is stored at upper memory 103. Data processor 101 then issues a memory read request at system bus 112 indicating the address of the interrupt related code. When the interrupt related code is available at cache subsystem 102, cache subsystem 102 provides the code to data processor 101 and data processor 101 executes the interrupt related code.

Data processor 101 can also access data stored at upper memory 103. Data includes memory words that are not executable instructions to data processor 101. Data words are read in substantially similar manner to code words. While memory words containing code are generally only read, data words can be written as well as read. Writing data words requires cache memory subsystem 102 to store additional information concerning memory words stored at cache memory 117 as will be described herein.

Upper memory 103 is a relatively slow memory, and can be of a type that accesses blocks of memory words in response to a single read request. For example, upper memory 103 can be a FLASH memory having 8-2-2-2 timing. This timing indicates a memory which requires eight clock cycles to access an initial memory word of a block and two clock cycles to access each of three additional memory words of the block. In an embodiment, access to memory words in a FLASH memory may be sequential, requiring words to be read out of the FLASH memory in a particular order. For example, access to the fourth word in a block four words in a FLASH memory can require eight clock cycles to read the first word, followed by two clock cycles to read the second and third words, before the fourth word can be accessed. Thus, access to code and data by processor 103 stored at upper memory 103 can be relatively slow. Cache memory subsystem 102 provides faster access by processor 100 to code and data by storing at cache memory 106 copies of a subset of code and data words which are stored at upper memory 103. Cache memory 106 is a faster type of memory than upper memory 103. For example, cache memory 106 can be a RAM memory which can access a memory word in one clock cycle. Thus, code and data words having copies stored at cache memory 117 can be accessed in significantly less time than code and data words which are stored only at upper memory 103. Cache memory 117 is organized into units referred to as cache lines. A cache line at cache memory 117 includes words that have consecutive addresses in upper memory 103. Organizing memory words in a cache memory allows certain information, for example information on whether cache memory data is valid, to be shared among a group of memory words. For example, in a digital system in which a FLASH memory which reads four memory words at a time it may be convenient for a cache memory line to be organized as four words. A single bit can be added to the cache memory line to indicate whether or not the cache line contains valid data. All four memory words will be indicated to be valid or invalid as a group. In cache memories which allow write operations, a similar bit can be added to a cache line to indicate that one or more of the memory words in a cache line contains data that has been written to a cache memory but not written to an upper memory. Such a bit is convenient to mark "dirty" cache data as described below.

In order to read or write a word of memory using cache memory subsystem 102, data processor 101 issues a request at system bus 112. The request includes an address of a memory word. When the request is for a write operation, the request also includes data to be written to memory. In various embodiments, the request includes other information such as whether the request is a request for executable program code or for data. Cache control circuitry 119 receives the request at system bus 112. Upon receiving the request, cache control circuitry 119 determines whether a copy of the memory word identified by an address included in the request is stored at cache memory 117. In an embodiment, cache control circuitry 119 includes a hit/miss control circuitry which determines whether a desired memory word is stored in a cache memory. Various methods for determining whether a copy of a memory word is resident at a cache memory are well known in the art. For example, cache control circuitry 119 can include a cache tag memory which is addressed by low order bits of addresses in memory requests. Data stored in the cache tag memory are the bits of an address not used to address the cache tag memory. Upon receiving an address contained in a memory request from data processor 101, low order bits of the address are used to select a word in the cache tag memory. The data bits at the selected address are compared to high order bits of the address contained in the memory request. The data stored at the cache tag memory bits being equal to the high order bits indicates that a copy of a memory word indicated in the request is in the cache memory. The data bits not being equal to the high order bits indicates that a copy of the memory word is not in the cache memory. Those skilled in the art will appreciate that variations of this scheme, such as including a valid bit with each word in the cache tag memory, as well as other caching schemes such as set associative cache memories can be used with the present invention. The exact cache memory subsystem design selected is a design choice made to conform to the particular operational requirements of digital system 100.

When cache control circuitry 119 determines that a copy of a memory word indicated by a memory request from data processor 101 is contained in cache memory 117, and the request is a memory read request, cache control circuitry 119 reads the requested memory word from cache memory 117 using cache memory bus 123. Cache control circuitry 119 then provides the memory word to data processor 101 at system bus 112. When cache control circuitry 119 determines that a copy of a memory word indicated by a memory request from data processor 101 is contained in cache memory 117, and the request is a memory write request, cache control circuitry 119 writes the data included with the memory request into a location at cache memory 117 and records an indication that the data stored at the location has not yet been written to upper memory 103. This situation, in which data has been written to cache memory 117 but not to upper memory 103 can be referred to as the data word in the cache being "dirty." An indication that a memory location at cache memory 117 contains dirty data can be maintained at the cache memory 106, at a cache tag memory or by other means known in the art. Those skilled in the art of cache design will appreciate that there are other ways of handling data writes in a digital system containing cache memory. For example, a data write operation can cause a copy of the memory word at cache memory 117 to be updated and the data to be written also directly to upper memory 103.

When cache control circuitry 119 determines that a copy of a memory word indicated by a memory request from data processor 101 is not contained in cache memory 117, cache control circuitry 119 provides a miss indication at miss interconnect 122 to cache fill circuitry 120. Cache fill circuitry 120 performs operations to place a copy of the requested memory word into cache memory 117. Reading of data into a cache memory is well known in art. Preparatory operations that are performed by cache fill circuitry 120 prior to reading memory words from upper memory 103 can include determining a location at cache memory 117 at which the memory words to be read from upper memory 103 will be stored, determining whether valid memory words are currently stored at the location, and invalidating the memory words at the location. Should the location contain memory words having "dirty" data that has not yet been written to upper memory 103, cache fill circuitry 120 will write the dirty memory words to upper memory 103 prior to invalidating the memory words in cache memory 117. After completing the preparatory operations, cache fill circuitry 120 reads memory words from upper memory through upper memory bus 116 and stores copies of the memory words into cache memory 117. In order to read a memory word from upper memory 103 cache fill circuitry 120 provides an access request to upper memory 103 on upper memory bus 116. In response to receiving the access request, upper memory 103 provides an access response containing the requested memory word. In an embodiment, upper memory 103 provides a plurality of access responses in response to a single access request. For example, upper memory 103 can be a FLASH memory which stores memory words in blocks of four. In response to an access request which requests one memory word of a block, the FLASH memory provides all of the memory words in the block. Each word is provided as a separate access response. In an embodiment, access responses from upper memory 103 can be suppressed after an access request has been received by upper memory 103. For example, upper memory bus 116 can include an abort signal to indicate that a request is to be terminated. In an embodiment, cache fill circuitry 120 can be suppressed from receiving access responses from upper memory 103. After a copy of the memory word requested by data processor 101 has been stored at cache memory 117, cache control circuitry can fulfill the request as described previously.

During a fill operation by cache fill circuitry 120 of a cache line in cache memory 117, cache memory subsystem 102 does not respond to requests at system bus 112 that also require the cache memory subsystem 102 to access the upper memory 103. Thus, should data processor 101 receive an interrupt indication at interrupt interconnect 113 during a fill operation, data processor 101 can make a request for a memory word related to processing the interrupt indication. However, if cache memory 117 does not contain the requested memory word, data processor 101 must wait until the fill operation completes before cache memory subsystem 102 can fulfill the request. Should an interrupt occur just as the cache memory subsystem 102 begins filling a cache line the interrupt latency can be long. However, should an interrupt occur just prior to cache memory subsystem 102 completing the fill of a cache line, or when cache memory subsystem 102 is idle, interrupt latency can be short. As discussed previously, variation in interrupt latency is undesirable in some digital system designs. In embodiments of the present disclosure, cache fill circuitry 120 can terminate filling a cache line in response to an indication from line fill termination circuitry 121 at termination signal interconnect 124. Line fill termination circuitry 121 can be connected to interrupt controller 104 by interrupt interconnect 125, and receive interrupt indications from interrupt controller 104 at substantially the same time as data processor 101 receives interrupt indications from interrupt controller 104. Termination of fill operations in response to interrupts can reduce average interrupt latency and also reduce variation in interrupt latency. The operation of digital system 101 using cache fill termination will be described with respect to FIGS. 2-4.

Figure 2:
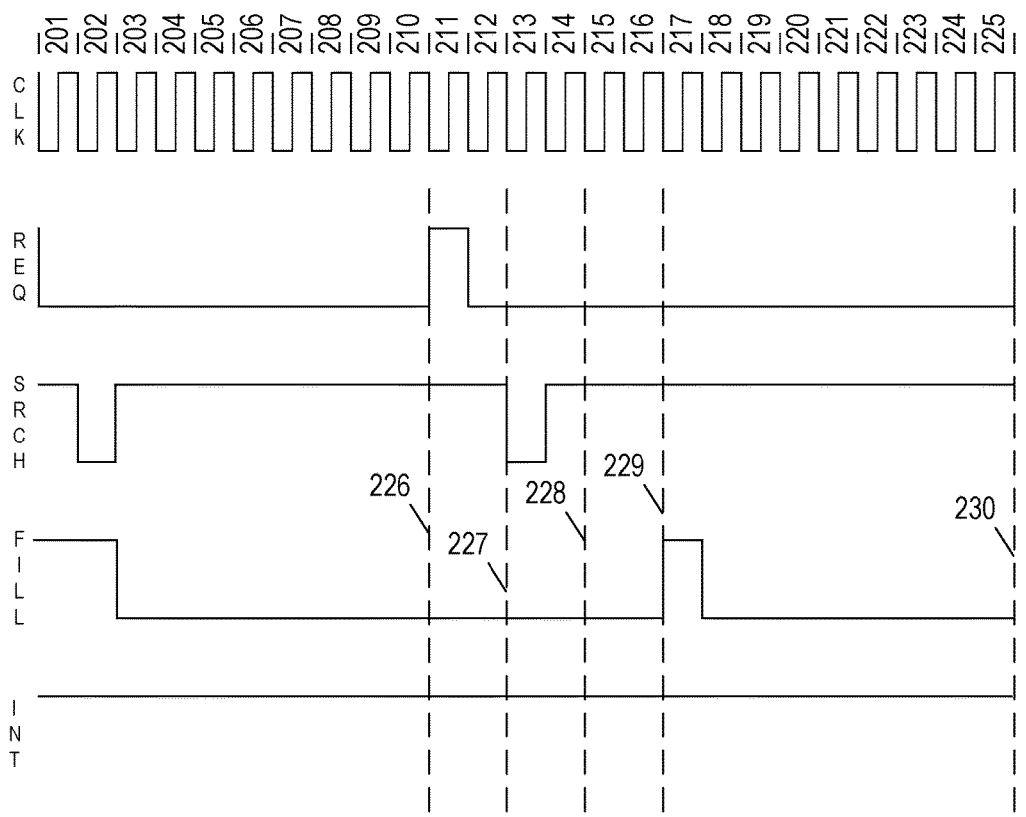
FIGS. 2-4 are timing diagrams illustrating relationships among operations in a digital system according to embodiments of the present disclosure.

FIG. 2 illustrates a timing diagram 200 showing the timing of operations within digital system 100 for a memory request resulting in a cache miss and a resulting cache line fill operation. The CLK signal indicates clock periods 201-225. The REQ signal indicates by a low signal value that data processor 101 makes a request for a memory word. The REQ signal returns to a high signal value in response to the requested memory word being returned by the cache memory subsystem. The word requested by data processor 101 can be referred to herein as the critical word. The SRCH signal indicates by a low signal value that cache control circuitry 119 is searching the cache memory for the requested memory word. The signal returns to a high value after one clock period, indicating that a search has completed. The fill signal having a low signal value indicates that cache fill circuitry 120 is performing a cache line fill operation. That is, cache fill circuitry 120 is transferring, e.g. copying, memory words from upper memory 103 to cache memory 117. Indications of times at which particular memory words are transferred to cache memory 117 and are provided to data processor 101 are indicated by dashed lines in the figures as appropriate.

The signals and signal names used at FIG. 2 are chosen for clarity of explanation regarding the timing of various operations and may not necessarily represent actual signals within various embodiments of digital system 100. Further, those skilled in the art will appreciate that the timing of operations may vary from the figures herein while remaining within the scope of the present inventions. For example, the figures illustrate the SRCH signal transitioning to a low value, indicating a cache search operation, one clock following the transition of the REQ signal transition to a low value indicating a memory request. In embodiments, a cache search can be performed in the same clock period as the assertion of a memory request signal. In other embodiments, a cache search can take longer than a single clock period, reading the upper memory 103 can require a different amount of clock cycles, and the transfer from the upper memory to the cache memory 117 can also require a different amount of clock cycles.

At clock period 201, data processor 101 makes a request for a memory word, as indicated by a low value at the REQ signal. Cache control circuitry 119 searches cache memory 117 for the requested memory word at clock period 202 as indicated by the SRCH signal having low value. The REQ signal remains low at clock period 202 to indicate that the request has not yet been fulfilled by cache memory subsystem 102. At clock period 203, cache control circuitry 119 has determined that the requested memory word is not in cache memory 117 and cache fill circuitry 120 begins reading from upper memory 103, followed by the transfer, e.g. copy, of the memory words into cache memory 117. The timing of the FILL signal illustrated at FIG. 2 shows upper memory 103 as a FLASH memory with 8-2-2-2 timing. Reading and transferring the initial memory word from upper memory 103 takes eight clock periods, beginning at the start of clock period 203 and ending at time 226. The initial memory word is the word requested by data processor 101. Concurrently with storing the initial memory word into cache memory 117, the cache memory subsystem 102 provides the initial memory word to data processor 101. Upon receiving the initial memory word, data processor 101 returns the REQ signal to a high value at clock 211. Cache memory subsystem 102 continues filling a cache line. The initial memory word can be any word in the cache line being filled. In particular, it can be a memory word other than the lowest or highest addressed memory word in a cache line. Subsequent memory words of a cache line can be filled in any order which is convenient. Reading and transferring the second memory word from upper memory 103 takes two clock periods, beginning at time 226 and ending at time 227. Similarly, reading and transferring the third memory word begins at time 227 and ends at time 228, and reading and transferring the fourth memory word begins at time 228 and ends at time 229. At time 229 the cache fill operation is complete.

While cache memory subsystem 102 continues the cache line fill operation, at clock period 212 data processor 101 makes another request for a memory word. Cache memory subsystem 102 searches the cache memory for the requested memory word at clock period 213 as indicated by a low value at the SRCH signal. The requested memory word is not found in the cache memory, but cache memory subsystem 102 cannot fulfill the request immediately because it is performing a cache line fill operation in response to the memory request made by data processor 101 at clock period 201. This condition is illustrated at FIG. 2 by the REQ signal remaining in a low state beginning at clock period 212. At time 229 the fourth word of the cache line fill operation performed in response to the request made at clock period 201 has been stored into cache memory 117 and cache memory subsystem 102 is able to begin a cache line fill in response to the request made by data processor 101 at clock period 212. At clock period 218 cache fill circuitry 120 begins another read operation on upper memory 103. The requested memory word is returned by cache memory subsystem 102 to data processor 101 at time 230.

Figure 3:
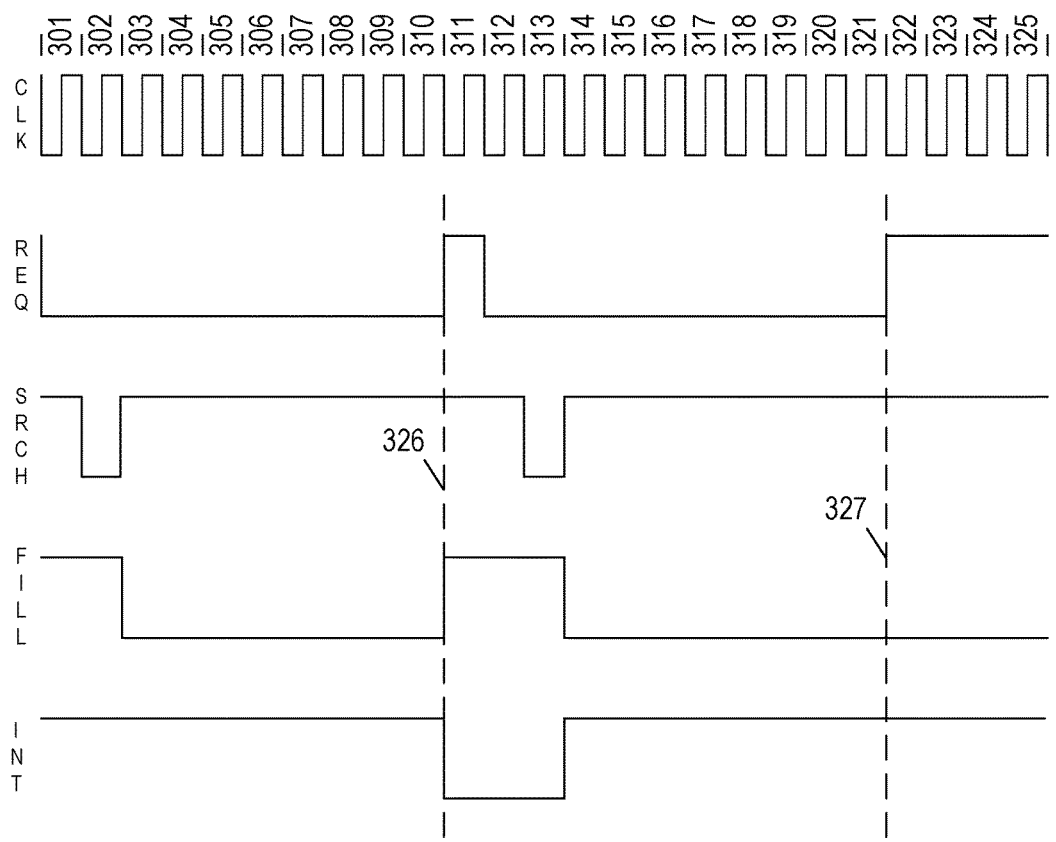

FIG. 3 illustrates a timing diagram 300 showing a behavior of digital system 100 with the addition of an interrupt indication from interrupt controller 104. FIG. 3 shows the same signals as FIG. 2. The INT signal represents the interrupt indication provided by interrupt controller 104 to line fill termination circuitry 121. The CLK signal indicates clock periods 301-325. Similar to the operations shown at clock periods 201-210, clock periods 301-310 show a memory request made by data processor 101 at clock period 301, a cache search by cache control circuitry 119 at clock period 302 and, in response to the requested memory word not being found in cache memory 117, cache fill circuitry 120 beginning a cache line fill at clock period 303. The requested memory word is returned by cache memory subsystem 102 to data processor 101 at time 326. In contrast to the timing at FIG. 2, at time 326 the INT signal provides an interrupt indication to line fill termination circuitry 121, as indicated by the low value of the INT signal at clock period 311. In response to receiving the interrupt indication, line fill termination circuitry 121 provides an indication to cache fill circuitry 120. In response to receiving the indication, cache fill circuitry 120 terminates the cache line fill operation as indicated by the FILL signal transitioning to a high value at time 326.

The interrupt indication may also be provided to data processor 101 at clock period 311. Data processor 101 makes a request for an interrupt related memory word at clock period 312 and a cache search operation is performed at clock period 313. The requested memory word is not found in cache memory 117, however in contrast to the example shown at FIG. 2, the cache memory subsystem 102 is not performing a cache line fill operation at the time that the cache search operation performed in response to the second memory request completes. Thus, cache memory subsystem 102 can immediately begin a cache line fill operation at clock period 314. The requested memory word is returned to data processor 101 by cache memory subsystem 102 at time 327, eight clock periods after the beginning of the cache line fill operation, and data processor 101 may begin executing code related to an interrupt.

After termination of the fill operation at clock period 311, a cache line contains a memory word which was read by the terminated fill operation. The cache line can contain other memory words that had been stored at the cache line by previous memory requests. Thus, the cache line does not contain all of the words required for the cache line to be valid. In an embodiment, the entire cache line can be marked as invalid. In another embodiment, only the words of the cache line not filled by the cache fill operation can be marked as invalid.

A comparison of the timing diagrams at FIGS. 2 and 3 shows that, in the illustrated example, a cache memory subsystem which terminates a cache line fill operation in response to an interrupt indication can provide an interrupt related memory word to a processor in less time than a cache memory subsystem which cannot terminate a cache line fill operation. In the illustrated example, the use of the present invention allows the cache memory subsystem to provide an interrupt related memory word earlier than without the use of the present invention. Also the potential variation of delays resulting from the usage of hierarchical memories, like a cache, is significantly reduced. Skilled practitioners will appreciate that the particular number of clock periods by which interrupt response can be reduced will vary depending on design details of a particular embodiment and at which clock cycle of a cache line fill that an interrupt indication is received.

Figure 4:
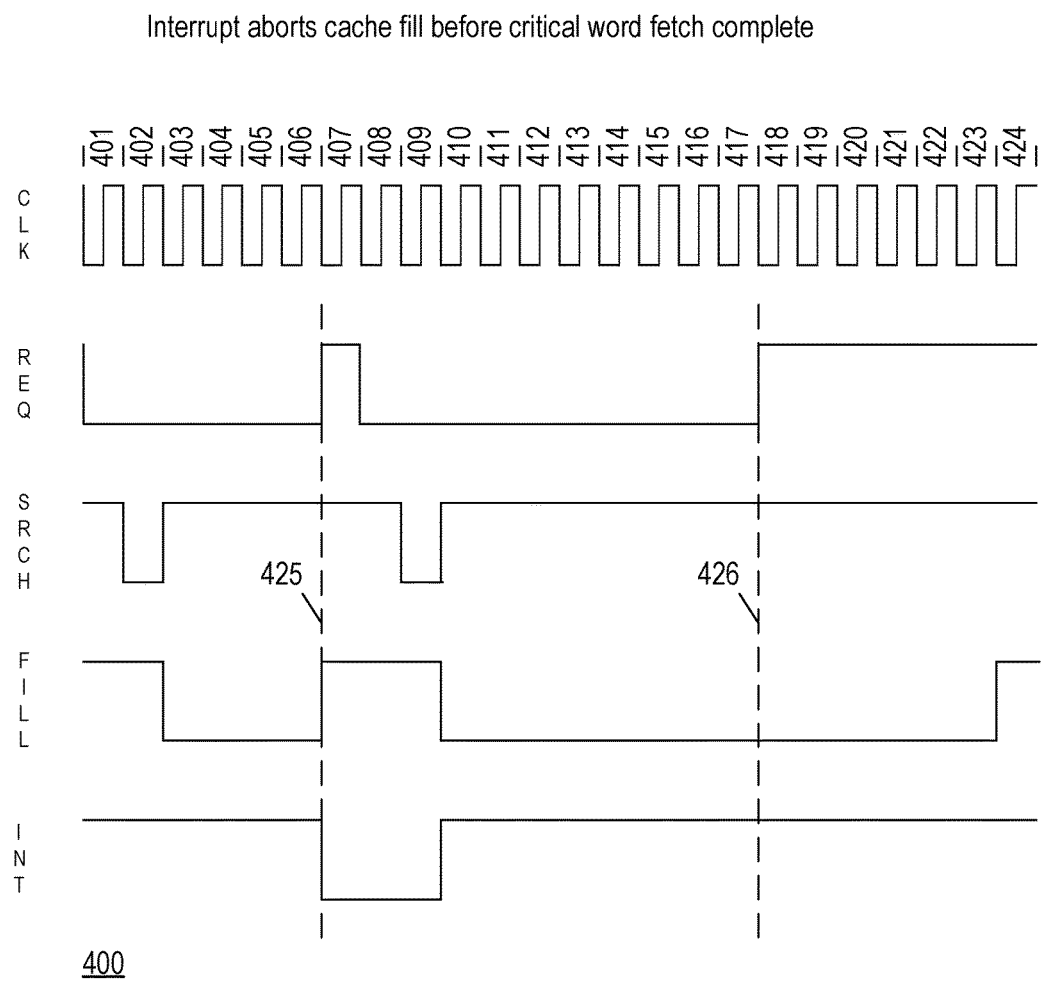

FIG. 4 illustrates another timing diagram 400 showing a behavior of digital system 100 with an interrupt indication from interrupt controller 104. FIG. 4 shows the same signals as FIG. 3. Clock periods 401-406 show operations similar to those of clock periods 301-306. Data processor 101 makes a request for a memory word at clock period 401, cache control circuitry 119 determines that the requested memory word in not stored at cache memory 117 at clock period 402, and cache fill circuitry 120 begins a cache line fill operation at clock period 403. In contrast with FIG. 3, at time 425 an interrupt indication is received by line fill termination circuitry 121 from interrupt controller 104 before cache fill circuitry 120 stores the first word of the cache line fill operation into the cache memory 117. In response to receiving an interrupt indication, line fill termination circuitry 121 provides a terminate indication to cache fill circuitry 120. In response to the indication, the cache line fill operation begun at clock period 403 terminates, as indicated by the FILL signal transitioning to a high level. As fewer than eight clock periods have elapsed between the beginning of the cache line fill operation at clock period 403 and the termination of the cache line fill operation upper memory 103 has not yet returned the first memory word. Thus no memory word has been written to cache memory 117 by the cache line fill operation before it has been terminated. No cache lines in cache memory 117 are modified. In an embodiment, the cache line status is left unchanged.

The interrupt indication is also provided by interrupt controller 104 to data processor 101. Data processor 101 makes a request for an interrupt related memory word at clock period 408. Cache memory subsystem 102 performs a cache search upon receiving the request from data processor 101, as shown by the low value of the SRCH signal at clock period 409. The requested memory word is not in the cache, as indicated by a cache fill operation by cache fill logic 120 beginning at clock period 410. The requested memory word is provided to data processor 101 by cache memory subsystem 102 at time 426.

Although the assertion of the INT signal occurs at FIG. 4 a different number of clock periods after the beginning of a cache line fill operation than at FIG. 3, the number of clock periods between the assertion of the INT signal and the return of the requested memory word to data processor 101 is eleven clock periods in both figures. As a cache line fill in progress is terminated by cache memory subsystem 102 in response to receiving an interrupt indication, variation in the number of clock cycles required to return a memory word related to an interrupt has been reduced in comparison with a cache memory subsystem which does not terminate cache line fill operations.

Figure 5:
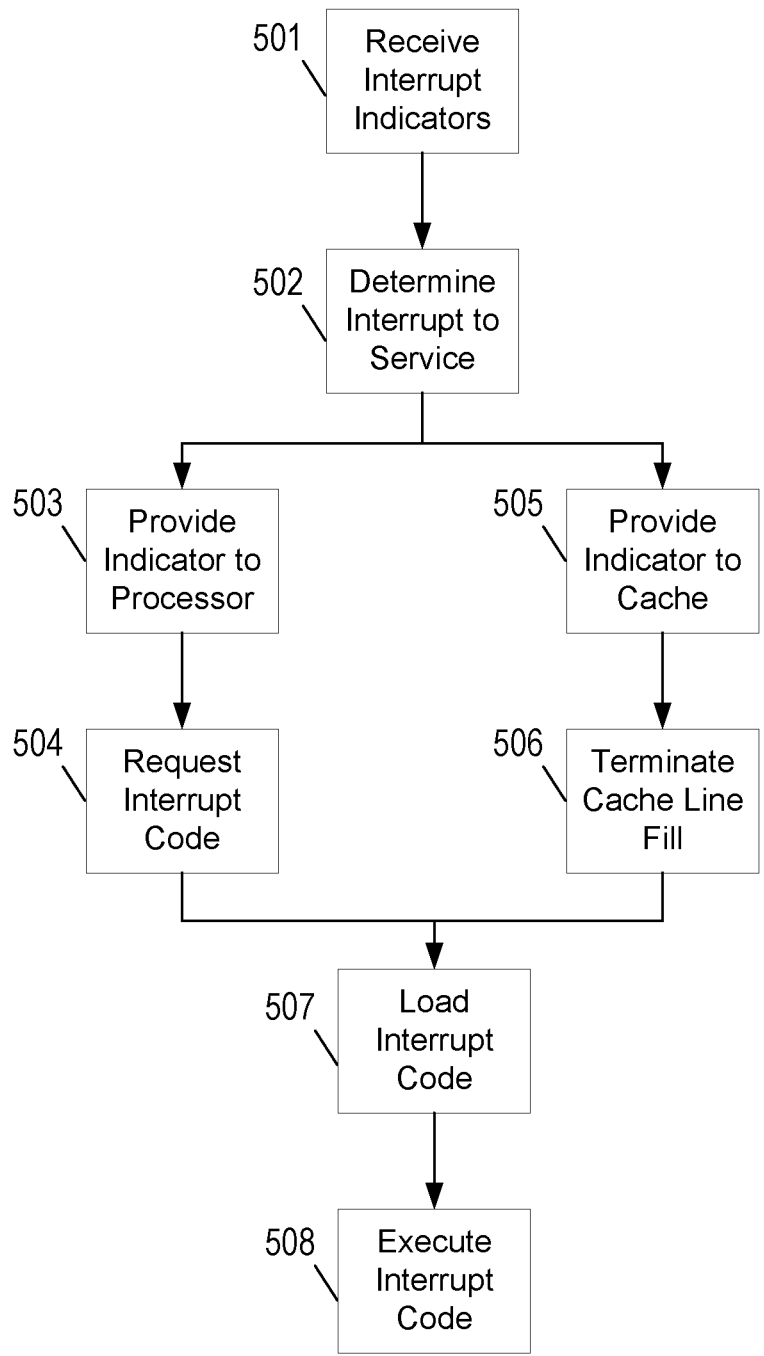
FIG. 5 is a flow diagram illustrating a method according to at least one embodiment of the present disclosure.

FIG. 5 shows a flow diagram illustrating a method for providing interrupt indications to a processor and to a cache memory subsystem. At step 501, interrupt indications are received from one or more interrupt devices. Interrupt devices can be real time clocks, display controllers, network controllers, RF modems, user interface devices and the like. As illustrated at FIG. 1, interrupt indications are received by interrupt controller 104 from interrupt devices 105 and 106. More than one interrupt indication can be received simultaneously, and a second interrupt indication can be received after a first interrupt indication but before the first interrupt indication has been serviced upon as described herein. At step 502, a determination is made as to which interrupt to service. Service an interrupt means to provide an indication of the interrupt to portions of a digital system which can take action in response to the interrupt indication. In response to more than one interrupt being received, a single interrupt to service is selected. Methods for determining an interrupt to service in response to receiving multiple interrupt indications are well known in the art. For example, interrupt devices can be assigned a priority when a digital system is designed. In response to receiving two interrupt indications, the interrupt indication originating at the interrupt device having the higher priority is serviced first.

After determining an interrupt to service, at step 503 an interrupt indication is provided to a processor. In response to receiving an interrupt indication, the processor makes a request for interrupt related code, in the form of memory words, from a memory system. In an embodiment, the memory system is a cache memory subsystem. At step 505, the interrupt indication is provided to a cache memory subsystem. Steps 503 and 505 can be performed at essentially the same time, such that a processor and a cache memory subsystem can begin processing of an interrupt indication in parallel. At step 506, in response to receiving the interrupt indication, the cache memory subsystem can terminate a cache line fill operation in progress. At step 507, in response to the processor making a request for code and to the cache memory subsystem having terminated a cache line fill operation, the cache memory subsystem begins loading interrupt related code into a cache memory.

In a first aspect, an information processing system can include a first device, an interrupt controller, a cache memory, cache control circuitry, cache fill circuitry and line fill termination circuitry. The first device including an output and being configured to provide a first event indicator at the output in response to an occurrence of a first event. The interrupt controller including a first output coupled to the output of the first device and a first interrupt output, the interrupt controller being configured to provide a first interrupt indicator at the first interrupt output in response to receiving the first event indicator at the first input. The cache control circuitry including a cache miss output, and being configured to provide a cache miss indicator at the cache miss output in response to a cache miss being detected. The cache fill circuitry including an input, the input being coupled to the cache miss output. The cache fill circuitry being configured to request a sequence of data items from an upper-level memory and to fill a cache line of the cache memory with the data items in response to receiving the cache miss indicator at its input. The line fill termination circuitry including a terminate fill input, the terminate fill input being coupled to the first interrupt output of the interrupt controller. The line fill termination circuitry being configured to terminate a fill of the cache line by the cache fill circuitry in response to receiving the interrupt indicator at the terminate fill input.

In one embodiment of the first aspect, the information processing system further includes a data processor. The data processor being coupled to the interrupt controller. The interrupt controller further including control circuitry to determine when to provide the interrupt indicator to the line fill termination circuitry and to the data processor. In a more particular embodiment, the interrupt controller further includes a second interrupt output being coupled to the data processor. The interrupt controller being further configured to provide the first interrupt indicator to the second interrupt output.

In another embodiment of the first aspect, the line fill termination circuitry upon termination causing the cache fill circuitry to mark a cache line as invalid if the cache fill circuitry stores any data item of the sequence of data items and otherwise leaving the cache memory unchanged when no cache line stores any data item of the sequence of data items. In a more particular embodiment, the line fill termination circuitry being further configured to suppress the cache fill circuitry from requesting the sequence of data items from the upper-level memory if the request to access the sequence of data items has not yet been provided to the upper-level memory, and to suppress the cache fill circuitry from receiving data of the sequence of data items when an access response has not yet been received after the request to access the sequence of data items has been provided. In another more particular embodiment, the line fill termination circuitry being further configured to suppress the cache fill circuitry from receiving a data item of the sequence of data items after an initial data item of the sequence has been received and before a final data item of the sequence has been received.

In a further embodiment of the first aspect, the interrupt controller being further configured to provide the interrupt indicator to the cache control circuitry.

In a second aspect, a method includes providing a first memory access request, initiating a first cache line fill, receiving a first event indicator, providing a first interrupt indicator, providing termination information and terminating the first cache line fill. The first memory access request being provided from a data processor. The first cache line fill being initiated by a cache memory subsystem in response to data requested by the first memory access not being in a cache memory. The first event indicator being received from a first interrupt device at an interrupt controller. The first interrupt indicator being provided by the interrupt controller, based upon the first event indicator, to the data processor for handling. The termination information being provided to the cache memory subsystem in response to receiving the first event indicator at the first interrupt device. The first cache line fill being terminated, by the cache memory subsystem in response to receiving the termination information, prior to filling a cache line.

In an embodiment of the second aspect, providing the first interrupt indicator to the data processor and providing the termination information occur substantially simultaneously.

In another embodiment of the second aspect, terminating includes marking the cache line being filled as invalid in response to one or more data portions of the cache line being written to the cache line being filled. In a more particular embodiment, terminating further includes leaving all cache lines of the cache un-modified in response to no data having been written by the first cache line fill.

In a further embodiment of the second aspect, terminating includes suppressing an access request from the cache memory subsystem to an upper-level memory for a first data item of a sequence of data items when the access request has not yet been started, and suppressing the cache fill circuitry from receiving data of the sequence of data items when an access response has not been received by the cache memory subsystem after the access request has been provided. In a more particular embodiment, terminating further includes suppressing subsequent access requests by the cache memory subsystem to the upper-level memory after the first data item has been received by the cache memory subsystem.

In a third aspect, a system can include a cache memory, a cache control circuitry, a cache fill circuitry and line fill termination circuitry. The cache control circuitry can include a cache miss output. The cache control circuitry being configured to provide a cache miss indicator at the cache miss output in response to a cache miss being detected. The cache fill circuitry can include an input, the input being coupled to the cache miss output. The cache fill circuitry being configured to read a sequence of data items from an upper-level memory and to fill a cache line of the cache memory with the data items in response to receiving the cache miss indicator at its input. The line fill termination circuitry can include a terminate fill input. The line fill termination circuitry being configured to terminate a fill of the cache line by the cache fill circuitry in response to receiving an interrupt indicator at the terminate fill input prior to a fill operation being completed.

In an embodiment of the third aspect, the terminate fill input can be coupled to an interrupt output of an interrupt controller.

In another embodiment of the third aspect, the terminate fill input can be coupled to an output of a processor.

In a further embodiment of the third aspect, the line fill termination circuitry marking a cache line that stores any data item of the sequence of data items as invalid in response to receiving the interrupt indicator at its terminate fill input prior to a fill operation being completed.

In yet a further embodiment of the third aspect, the line fill termination circuitry leaving the cache memory unchanged when no cache line stores any data item of the sequence of data items in response to the interrupt indicator at its terminate fill input prior to a fill operation being completed.

In yet a further embodiment of the third aspect, the line fill termination circuitry being further configured to suppress the cache fill circuitry from requesting the sequence of data from the upper-level memory if an access request to access the sequence of data items has not yet been provided to the upper-level memory, and to suppress the cache fill circuitry from receiving data of the sequence of data items if an access response has not yet been received after the request to access the sequence of data items has been provided.

In yet a further embodiment of the third aspect, the line fill termination circuitry is further configured to suppress subsequent access requests by the cache fill circuitry to the upper-level memory when an initial data item of the sequence of data items has been received.

What is claimed is:

1. An information processing system, comprising:
    a first device comprising an output, the first device configured to provide a first event indicator at the first device output in response to an occurrence of a first event;
    an interrupt controller including a first input coupled to the output of the first device, and a first interrupt output, the interrupt controller configured to provide a interrupt indicator at the first interrupt output in response to receiving the first event indicator at the first input;
    a cache memory;
    cache control circuitry including a cache miss output, the cache control circuitry to provide a cache miss indicator at the cache miss output in response to a cache miss being detected;
    cache fill circuitry including an input coupled to the cache miss output, and configured to request a sequence of data items from an upper-level memory and to fill a cache line of the cache memory with the data items in response to receiving the cache miss indicator at its input; and
    line fill termination circuitry including a terminate fill input coupled to the first interrupt output of the interrupt controller, and configured to terminate a fill of the cache line by the cache fill circuitry in response to receiving the interrupt indicator at the terminate fill input.

2. The information processing system of claim 1 further comprising a data processor coupled to the interrupt controller, and wherein the interrupt controller further includes control circuitry to determine when to provide the interrupt indicator to the line fill termination circuitry and to the data processor.

3. The information processing system of claim 2, wherein the interrupt indicator is also provided to a second interrupt output of the interrupt controller that is coupled to the data processor.

4. The information processing system of claim 1, wherein the line fill termination circuitry upon termination causes the cache fill circuitry to mark a cache line as invalid if the cache line stores any data item of the sequence of data items, and otherwise leaves the cache memory unchanged when no cache line stores any data item of the sequence of data items.

5. The information processing system of claim 4, wherein the line fill termination circuitry is further configured to suppress the cache fill circuitry from requesting the sequence of data items from the upper-level memory if the request to access the sequence of data items has not yet been provided to the upper-level memory, and to suppress the cache fill circuitry from receiving data of the sequence of data items when an access response has not yet been received after the request to access the sequence of data items has been provided.

6. The information processing system of claim 4, wherein the line fill termination circuitry is further configured to suppress the cache fill circuitry from receiving a data item of the sequence of data items after an initial data item of the sequence has been received and before a final data item of the sequence has been received.

7. The information processing system of claim 1, wherein the interrupt controller is further configured to provide the interrupt indicator to the cache control circuitry.

8. A method, comprising:
    providing a first memory access request from a data processor;
    initiating a first cache line fill by a cache memory subsystem in response to data requested by the first memory access request not being in a cache memory;
    receiving at an interrupt controller a first event indicator from a first interrupt device;
    providing a interrupt indicator from the interrupt controller based upon the first event indicator to the data processor for handling;
    providing termination information to the cache memory subsystem in response to receiving the first event indicator; and
    terminating, by the cache memory subsystem, the first cache line fill prior to filling a cache line in response to receiving the termination information.

9. The method of claim 8, wherein providing the interrupt indicator to the data processor and providing the termination information occur substantially simultaneously.

10. The method of claim 8, wherein terminating includes marking the cache line being filled as invalid in response to one or more data portions of the cache line being filled being written to the cache line being filled.

11. The method of claim 10, wherein terminating further includes leaving all cache lines of the cache un-modified in response to no data having been written by the first cache line fill.

12. The method of claim 8, wherein terminating includes:
    suppressing an access request from the cache memory subsystem to an upper-level memory for a first data item of a sequence of data items, when the access request has not yet been started; and
    suppressing the cache fill circuitry from receiving data of the sequence of data items when an access response has not been received by the cache memory subsystem after the access request has been provided.

13. The method of claim 12, wherein terminating further includes:
  suppressing subsequent access requests by the cache memory subsystem to the upper-level memory after the first data item has been received by the cache memory subsystem.

14. A system, comprising:
  a cache memory;
  a cache control circuitry including a cache miss output, the cache control circuitry to provide a cache miss indicator at the cache miss output in response to a cache miss being detected;
  a cache fill circuitry comprising an input coupled to the cache miss output, and configured to read a sequence of data items from an upper-level memory and to fill a cache line of the cache memory with the data items in response to receiving the cache miss indicator at its input; and
  line fill termination circuitry including a terminate fill input and configured to terminate a fill of the cache line by the cache fill circuitry in response to receiving an interrupt indicator at the terminate fill input prior to a fill operation being completed.

15. The system of claim 14, wherein the terminate fill input is coupled to an interrupt output of an interrupt controller.

16. The system of claim 14, wherein the terminate fill input is coupled to an output of a processor.

17. The system of claim 14, wherein the line fill termination circuitry marks a cache line that stores any data item of the sequence of data items as invalid in response to receiving the interrupt indicator at its terminate fill input prior to the fill operation being completed.

18. The system of claim 14, wherein the line fill termination circuitry leaves the cache memory unchanged when no cache line stores any data item of the sequence of data items in response to receiving the interrupt indicator at the terminate fill input prior to the fill operation being completed.

19. The system of claim 14, wherein the line fill termination circuitry is further configured to suppress the cache fill circuitry from requesting the sequence of data from the upper-level memory if an access request to access the sequence of data items has not yet been provided to the upper-level memory, and to suppress the cache fill circuitry from receiving data of the sequence of data items if an access response has not yet been received after the request to access the sequence of data items has been provided.

20. The system of claim 14, wherein the line fill termination circuitry is further configured to suppress subsequent access requests by the cache fill circuitry to the upper-level memory when an initial data item of the sequence of data items has been received.

* * * * *